Figure 1:
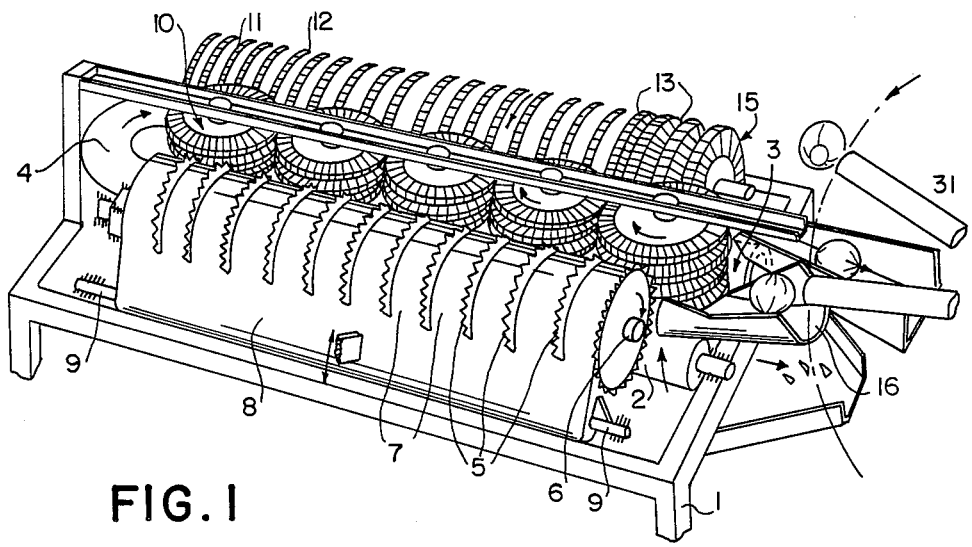

United States Patent [19]

Backus

[11] Patent Number: 4,889,045

[45] Date of Patent: Dec. 26, 1989

[54] APPARATUS FOR PEELING BULBOUS PLANTS

[75] Inventor: Petrus A. M. Backus, Venlo, Netherlands

[73] Assignee: Backus Sormac B.V., Netherlands

[21] Appl. No.: 144,271

[22] Filed: Jan. 15, 1988

[30] Foreign Application Priority Data

Jan. 15, 1987 [NL] Netherlands ............... 8700088

[51] Int. Cl.⁴ .................. A23N 7/00; A23N 15/08
[52] U.S. Cl. ................... 99/546; 99/516; 99/584; 99/626; 99/636
[58] Field of Search ......... 99/485, 516, 546, 534–536, 99/537–540, 567, 591, 584–589, 593–595, 574–576, 623–626, 636; 426/482, 483; 83/877, 876, 884

[56] References Cited

U.S. PATENT DOCUMENTS

| | | | |
|---|---|---|---|
| 2,376,587 | 5/1945 | Diller | 99/626 X |
| 4,242,952 | 1/1981 | van der Schoot | 99/625 |
| 4,450,760 | 5/1984 | Wilson | 99/623 |
| 4,470,345 | 9/1984 | Miyata | 99/584 |
| 4,476,778 | 10/1984 | Clyma | 99/584 |
| 4,481,875 | 11/1984 | Toyosato | 99/516 |
| 4,602,559 | 7/1986 | Suzuki et al. | 99/516 |
| 4,611,532 | 9/1986 | Trinkley | 99/623 X |

FOREIGN PATENT DOCUMENTS

| | | | |
|---|---|---|---|
| 0033180 | 8/1981 | European Pat. Off. | 99/584 |
| 7906250 | 2/1981 | Netherlands | 99/584 |

*Primary Examiner*—Timothy F. Simone
*Attorney, Agent, or Firm*—John P. Snyder

[57] ABSTRACT

The invention relates to an apparatus for peeling bulbous plants, such as onions, the apparatus consisting substantially of cutting means for removing the tail and head of the bulb, incision means for making an incision into at least the outer skin of the bulb, friction means for removing the incised skin and a conveyor for carrying the bulbs series-wise along these means.

13 Claims, 3 Drawing Sheets

APPARATUS FOR PEELING BULBOUS PLANTS

The invention relates to an apparatus for peeling bulbous plants, such as onions, the apparatus consisting substantially of cutting means for removing the tail and head of the bulb, incision means for making an incision into at least the outer skin of the bulb, friction means for removing the incised skin and a conveyor for carrying the bulbs serieswise along these means.

Many embodiments of peeling apparatus have been proposed already in the past, but all of them had the drawback of quite a lot of waste and comparatively large installations relative to capacity.

The invention has for its object to improve an apparatus of the type described in the preamble such that the offal is considerably reduced and the capacity is large in proportion to the size of the apparatus itself.

The apparatus according to the invention is distinguished in that the incision means are formed by a number of incision discs driven for rotation disposed alongside one another, the common drive shaft of which extends parallel, or virtually parallel, along a side of the conveyor, and that one or more filler bodies are arranged between the discs, whereby the friction means consist of at least one brush fitted along the other side of the conveyor.

Because the incision means and friction means are located facing each other, the length of the conveyor can be considerably limited.

For efficient removal of the incised skin the brush is preferably formed for rotation.

To achieve an effective incision action and friction action the conveyor takes the form of a roller of which the horizontal axis of rotation extends in the conveying direction and whereby a group of brushes are arranged alongside one another, each of which can rotate on an axis that is vertical relative to the horizontal roller axis.

Because of the rotary conveyor the bulb is always positioned with a different surface facing the brushes and incision discs, which considerably enhances the peeling action.

In order to decrease its length the conveyor is given a U-shape, whereby each limb is formed by a conveyor roller and whereby the incision means are arranged alongside the one roller, the group of brushes between both rollers and a second brush alongside the second roller.

In order to be able to properly process bulbous plants of different sizes, each brush preferably consists of brush discs having an alternating large and small diameter.

In order to adapt the incision action of the incision discs to the type of bulb to be handled, the or each filler body can be adjusted radially relative to the incision discs.

The apparatus is preferably formed with a delivery device on the in-feed side of the conveyor, this device consisting of one or more movable carriers provided with at least one retractable pin, each for picking up a bulb.

These carriers are preferably guided past cutting means for removing the top and tail of the bulb.

In one embodiment the cutting means consist of two parallel cutting discs for making a preliminary cut as well as a second pair of cutting discs arranged relative to the conveying direction, each of which is provided with an associated orientating disc.

In order to realize automatic adaptation to the size of the bulb to be handled the orientating discs are biased towards each other under spring pressure.

The invention is further elucidated in the figure description of an embodiment following hereinafter.

Figure 4:
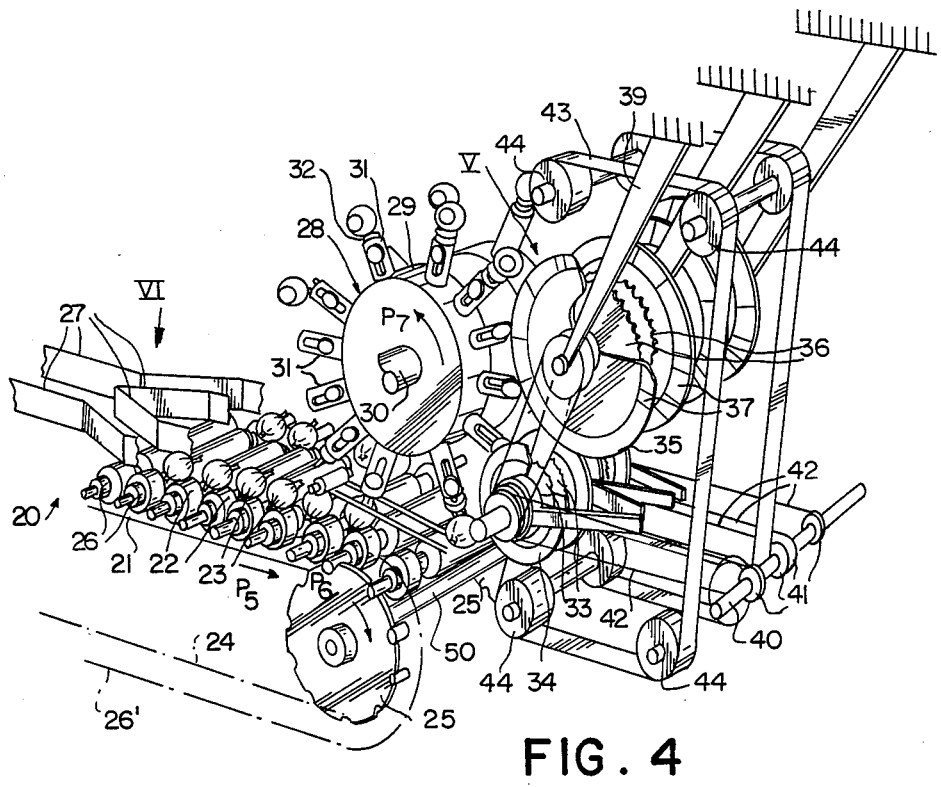
Figure 2:
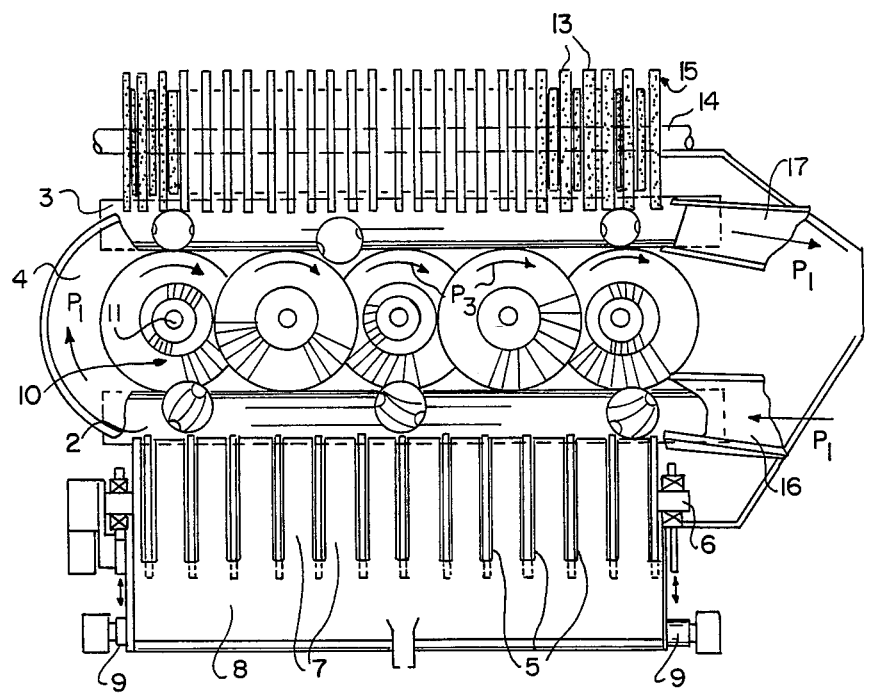
Figure 3:
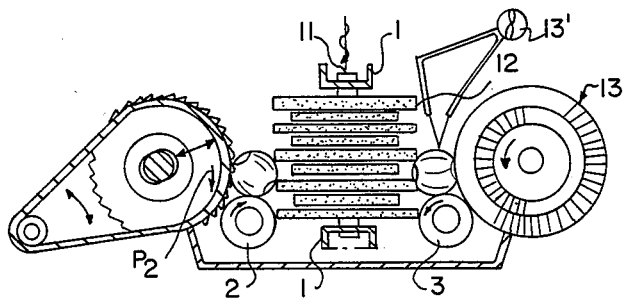
Figure 5:
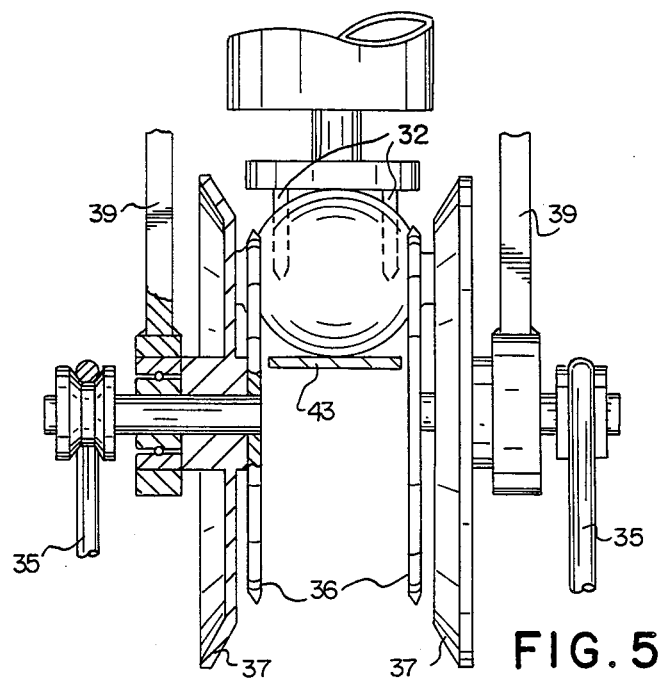
Figure 6:
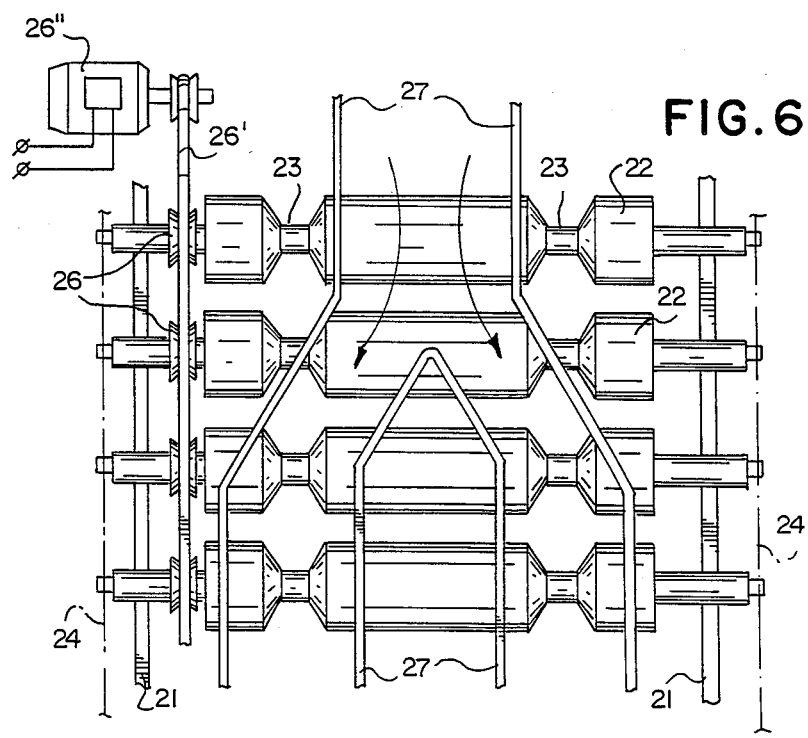

In the drawing:

FIG. 1 shows a perspective view of a part of the peeling apparatus, which part is provided with incision and brush means, FIG. 2 is a top view of the apparatus from FIG. 1, FIG. 3 is a front view of the apparatus from FIG. 1 and FIG. 4 shows a perspective top view of another part of the peeling apparatus according to the invention provided with the topping and tailing means, FIG. 5 and 6 each show a front view of the pre-cutting and trimming discs employed in the device from FIG. 4 as according to the arrow V, FIG. 6 shows a top view of the device from FIG. 4 as according to arrow VI.

The apparatus shown in FIG. 1–3 consists substantially of a random suitable frame 1 onto which is mounted a conveyor in the form of two parallel rollers 2, 3. The rotation axis of these rollers extends in the conveyor direction, designated with the arrows $P_1$, this conveyor direction being U-shaped as is apparent from FIG. 2. Arranged for connection between both parallel rollers on the left-hand side in FIG. 2 is a round conveyor chute 4, so that the bulbs which move from bottom right in FIG. 2 to the left can be transferred to the left-hand in-feed side of the upper roller 3.

The incision means fitted in this apparatus consist of a number of parallel incision discs 5 in the form of saw plates, all of which are mounted on a common drive shaft 6. The driving shaft 6 is not shown and can be performed with any suitable drive means. The direction of rotation of the discs is as according to the arrow $P_2$, as indicated in FIG. 3.

Arranged between the discs 5 are filler bodies 7 which are coupled to one another by a connecting body 8 which is provided at both ends with axle journals 9 for mounting in frame 1. During rotation of the incision discs 5 the filler bodies in accordance with the embodiment of FIG. 1 and 2 remain immobile. Each filler body is formed for this purpose with a bearing which rests on the common drive shaft 6 of discs 5.

It is possible to form the bearing of the connecting body 8 in the frame 1 such as to enable a radial displacement of the incision discs 5 relative to the common drive shaft 6, so that the teeth of discs 5 protrude more or less outside the peripheral surface of the filler bodies 7. The incision depth of the discs is in this way determined.

It is also possible by way of an angular displacement of the axle journals 9 relative to the common shaft 6 to determine the peripheral operating angle of the cutting teeth of incision discs 5. This can be of importance for the setting of the apparatus in accordance with the type and size of the bulbous plant.

Arranged between both the rollers 2, 3 of the longitudinal conveyor is a group of brushes 10, whereby each brush is mounted on an upright shaft 11 which is attached to frame 1 at the top and bottom.

The brush 10 with its shaft 11 is formed at the top or bottom with, for example, a sprocket wheel for a drive chain (not shown), in order to make the brushes rotate always in the direction of the arrow $P_3$, see FIG. 2.

The brush consists of a number of brush discs 12 with alternating large and small diameters, such that the brushes arranged adjacent to one another can grip into one another.

Arranged adjoining the second roller 3 of the conveyor on the side thereof facing away from brushes 12 is a second brush 13 which is driven for rotation on a horizontal shaft 14 parallel to rollers 2, 3. This brush consists also of a group of discs 15 with alternating large and small diameter, thereby ensuring not only the self-cleaning action of the brush but also a good adaptation to different sizes of the bulbous plant itself.

Placed at the in-feed and discharge side of the conveyor are respectively a feed chute 16 and a discharge chute 17. The operation of the above described part of the apparatus is as follows:

When bulbous plates are fed into feed chute 16, which will be further explained below with reference to the FIG. 4–6, the bulbous plant arrives at the start of the longitudinal conveyor, that is, the first roller 2, and as a result of the revolving of roller 2 is set into a rotating movement. As a result of this rotating movement and under the influence of the revolving, transporting movement of brushes 10 the bulb is carried past the incision discs 5 over the full length of conveyor roller 2. Since the bulb is subjected to a rotating movement over two axes that are perpendicular to each other as a consequence of the rotation of the roller 2 and the brushes 10, a different part of the skin will always be brought into contact with the incision blades 5. In view of the fact that the bulb supports on a filler body 7 between incision blades 5, incision will only be carried out over a particular depth, sufficient to cut through the outer layer of skin. As a result of the chafing action of brushes 10 a part of the skin is already removed.

At the end of the first roller 2 the wholly or partially peeled bulb arrives at the conveyor chute 4 and is transferred as a result of the pushing action of the outermost brush 10 to the start of the second roller 3. During this returning movement the bulb again undergoes the cleaning action of the brush group 10 and the longitudinal brush 15. All possibly remaining skin appendages ae removed here. As a consequence of the rotary movement of roller 3 and of brushes 10 the bulb is carried away in longitudinal direction as according to arrow $P_1$ to discharge chute 17. The peeling action can be ameliorated by placing air jets 13' on a or several locations along the conveying path (see FIG. 3).

The invention relates in addition to a device for removing the tops and tails of bulbous plants, which part of the apparatus is shown in the FIG. 4–6.

This device consists substantially of a supply section 20 consisting of parallel rails 21, over which a group of rolls 22 provided with notches 23 is moved forward in the direction of the arrow $P_5$. Each of the rolls 22 is attached for this purpose at the outer ends to a drive chain, the pitch circle of which is indicated with 24, so that an endless ladder conveyor results. At the rear end shown in FIG. 4 this conveyor is guided round guide discs 25 each of which is attached to a common drive shaft 50. Driving of the shaft 50 results in a rotating movement in the direction of the arrow $P_6$ which carries with it the rolls 22. Rolls 22 are also furnished with friction wheels 26 over which an endless rope 26' is placed, as a result of which each roll 22 will rotate. Into each notch 23 falls a bulb which, because of the turning of the rolls, is set into rapid rotation such that an orienting action is created, that is, the top and tail are orientated horizontally.

In order to improve the orienting action of the bulb the feed onto the series of rolls 22 is such that it takes place between or alongside the notches. The bulbs are subsequently guided through guide partitions 27 to the notches 23 whereby they are further aligned; this is dependent on the number of revolutions of the rolls 22 which is determined by the speed of revolution of the motor 26" for the rope 26', the rolls being driven independently of their speed of forward movement $P_5$.

As soon as the bulbs have arrived at the end of the conveyor in the vicinity of guide rollers 25, the oriented bulbs can be taken over by a pick-up/delivery device 28, which consists of a cylindrical housing 29 which is mounted in a frame (not further shown) for rotation by means of a shaft 30 in the direction of the arrow $P_7$. Along the cylinder casing the housing 30 is formed with a number of radially directed carriers 31 in which a pin mechanism in the form of a fork-like member 32 is accommodated for sliding. This pin mechanism is controlled by a control mechanism (not further shown) in housing 29. The pin mechanism or fork 32 is controlled such that at the end of the conveyor the oriented bulb can be taken up by inserting the pin 32 with force into the bulb. The bulb, with top and tail oriented towards either side, that is, in the direction of the shaft 30, then comes up against two cutting discs 33 each of which has an orientating disc 34. These cutting discs serve to pre-cut the top and tail, whereby the orientating disc ensures guiding of the cutting disc. Each pre-cutting disc 33 with orientating disc is driven independently of the one situated opoposite. In addition each cutting disc with orientating disc is suspended on a drive rope 35 which leads to a second group of cutting discs 36 with orientating disc 37.

This group hangs on a suspension member 39 of random type close to a more elevated part of the circular path along which the bulb is carried by means of the pick-up/delivery device 28.

Because the cutting-orientating discs of each group are suspended and driven independently of each other, the space between the cutting discs of each group is free, so that comparatively small knife discs can be used because their diameter must at least correlate with the largest bulb to be handled. The drive speeds can of course be random, whereby those of the first and second group can vary from each other, but can also be the same.

The common driving of the cutting discs with orientating discs is performed by a central drive shaft 40 provided with pulleys 41 over each of which is drawn a rope 42 which leads to a pulley on the outside of the orientating disc 34 of the lower group.

In order to improve the attachment of the bulbs to the pins 31 during handling and cutting with the cutting groups, an endless belt 43 is guided between the cutting groups. This belt is guided over suitable guide wheels 44, one of which is driven.

The bulb with its top and tail thus removed is carried further in the direction of the arrow $P_7$ and can then be removed from carrier 31 by retraction of the fork mechanism 32. This moment can be seen on the right in FIG. 1, whereby the bulb that has been thrown off is delivered into the feed chute 16 of the apparatus from FIG. 1 and is further processed as described above with reference to the FIG. 1–3.

The invention is not limited to the above described embodiment. So for example the roller conveyor parts 2, 3 do not have to lie parallel to each other but can also be arranged so as to be in line with each other. The top and tail removing device as in FIG. 4 can also take a different form without this having an adverse effect on the form and operation of the peeling apparatus as according to the FIG. 1–3.

I claim:

1. Apparatus for removing outer skin covering of bulbous produce such as onions, which comprises the combination of means for removing head and tail portions of the produce to provide a residual body of generally spherical form having opposite ends which are severed to expose usable portions of the produce devoid of skin covering, conveyer means receiving the residual body for traveling it along a path and including friction means for rotating the residual body about axes which are generally orthogonally related, and cutter means disposed adjacent to and laterally of said conveyor means for penetating only the outer skin covering of the residual body as such body moves along the path whereby the friction means peels off the severed outer skin covering as the residual body progresses along the path.

2. Apparatus for removing outer skin coverings of individual bulbous produce such as onions, which comprises the combination of first conveyer means for traveling the produce along a first path while rapidly rotating each individual produce about a horizontal axis at a speed sufficient to orient each individual produce with head and tail portions thereof extending generally horizontally, transfer means for impaling and picking up each individual oriented produce from the first conveyer means and depositing it at a second site while passing along a second path, cutter means at opposite sides of the second path between the first conveyer means and the second site for cutting off the head and tail portions of the produce to leave residual bodies of the produce which are bulbous, second conveyer means having an inlet at the second site for receiving the residual bodies and for traveling them along a third path and including friction means for rotating each of the residual bodies about axes which are generally orthogonally related, and cutter means for penetrating only the outer skin covering of the residual bodies as such bodies move along the third path whereby the friction means peels off the severed outer skin coverings as the residual bodies progress along the third path.

3. Apparatus as defined in claim 2 wherein the third path is U-shaped to define adjacent horizontal legs and the second conveyer means includes rotary means bridging between such legs for moving residual bodies in opposite directions along such legs.

4. Apparatus as defined in claim 3 wherein the second conveyer means overlies the first conveyer means and the transfer means comprises a rotary mechanism which elevates the produce from the lower level of the first conveyer means to the higher level of the second conveyer means.

5. Apparatus for removing outer skin coverings of individual bulbous produce such as onions comprising, cutting means for cutting off the tail and head portions of the produce to leave residual bodies of the produce which are bulbous, conveyer means for receiving the residual bodies and for moving them along a path, incision means disposed at one side of said path for making incisions into the outer skin of said residual bodies thereby producing incised skin, said incision means comprising a plurality of spaced incision discs, means for rotating said incision discs, filler body means disposed within the spaces between adjacent incision discs, the outer peripheries of said incision discs being disposed closer to said path than said filler body means, the filler body means serving to limit the depth of incision of said incision discs, amd removing means for removing the incised skin from said the residual bodies, said removing means being disposed at the other side of said path.

6. Apparatus as defined in claim 5 wherein said removing means comprises a brush means engageable with the residual bodies, and means for rotating said brush means.

7. Apparatus as defined in claim 6 wherein said brush means comprises a plurality of brush discs having alternating large and small diameters.

8. Apparatus as defined in claim 5 wherein said conveyer means comprises a conveyer roller having an axis of rotation extending substantially parallel with said path, said removing means comprising a plurality of brush means, and means for rotating each of said brush means about an axis disposed substantially perpendicular to said axis of rotation.

9. Apparatus as defined in claim 5 wherein said conveyer means is generally U-shaped to define a pair of spaced legs, each of said legs comprising a conveyer roller, said incision means being disposed adjacent one of said rollers, and a plurality of brush means mounted for rotation between said rollers, and a further brush means disposed adjacent the other of said rollers.

10. Apparatus as defined in claim 5 including means for adjusting the position of said filler body means relative to said incision discs.

11. Apparatus as defined in claim 5 including delivery means for delivering the bulbous plants to said cutting means, said delivery means including a movable carrier having at least one retractable pin for picking up a bulbous plant.

12. Apparatus as defined in claim 5 wherein said cutting means comprises a pair of spaced pre-cutting discs for making a preliminary cut in a bulbous plant, and a pair of spaced cutting discs for making a final cut in a bulbous plant, said pair of cutting discs having a pair of spaced orienting discs disposed adjacent thereto.

13. Apparatus as defined in claim 12 including resilient means for biasing said orienting discs toward one another.

* * * * *